(12) United States Patent
Adar et al.

(10) Patent No.: US 12,026,221 B2
(45) Date of Patent: *Jul. 2, 2024

(54) ENHANCED TIME SERIES FORECASTING (71) Applicant: Snowflake Inc., Bozeman, MT (US)

(72) Inventors: Michel Adar, Campbell, CA (US);
Boxin Jiang, Sunnyvale, CA (US);
Qiming Jiang, Redmond, WA (US);
John Reumann, Kirkland, WA (US);
Boyu Wang, Menlo Park, CA (US);
Jiaxun Wu, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,944

(22) Filed: Feb. 22, 2023

(65) Prior Publication Data
US 2023/0401283 A1      Dec. 14, 2023

Related U.S. Application Data

(63) Continuation of application No. 17/877,588, filed on Jul. 29, 2022, now Pat. No. 11,609,970.

(60) Provisional application No. 63/351,016, filed on Jun. 10, 2022.

(51) Int. Cl.
*G06F 17/18*      (2006.01)
(52) U.S. Cl.
CPC .................................. *G06F 17/18* (2013.01)
(58) Field of Classification Search
CPC . G06F 17/18; G06N 5/01; G06N 7/01; G06N 20/20

USPC .......................................................... 708/445
See application file for complete search history.

(56) References Cited

U.S. PATENT DOCUMENTS

| | | | | |
|---|---|---|---|---|
| 11,526,261 | B1* | 12/2022 | Leach | G06F 3/0484 |
| 2012/0158456 | A1 | 6/2012 | Wang et al. | |
| 2020/0143246 | A1* | 5/2020 | Li | G06F 16/26 |
| 2021/0224677 | A1 | 7/2021 | Tomic et al. | |
| 2021/0406598 | A1* | 12/2021 | Yang | G06F 18/211 |
| 2023/0419136 | A1* | 12/2023 | Raykar | G06N 5/045 |

OTHER PUBLICATIONS

Extended European Search Report dated Nov. 3, 2023 in corresponding EP patent application No. 23178452.1-1203.
Kedong, Z., et al., A hybrid prediction model based on pattern sequence-based matching method and extreme gradient boosting for holiday load forecasting; Electric Power Systems Research, Elsevier, Amsterdam NL, vol. 190, Sep. 15, 2020, XP086360078, ISSN: 0378-7796, DOI:10.1016/J.EPSR.2020.106841.

(Continued)

*Primary Examiner* — Tan V Mai
(74) *Attorney, Agent, or Firm* — Womble Bond Dickinson (US) LLP (57) ABSTRACT

Using an attributes model of a time series forecasting model, determine a set of features based on time series data, the set of features including periodic components. The time series data may be divided into a set of segments. For each segment of the set of segments, a weight may be assigned using an age of the segment, resulting in a set of weighted segments of time series data. Using a trend detection model of the time series forecasting model, trend data from the set of weighted segments of time series data may be determined. A time series forecast may be generated by combining the set of features and the trend data.

20 Claims, 9 Drawing Sheets

(56) References Cited

OTHER PUBLICATIONS

Obst, D., et al., "Textual Data for Time 4, 10 Series Forecasting", ARXIV.Org, Cornell University Library, 201 Olin Library Cornell University, Ithaca, NY, 14853, Oct. 25, 2019 (Oct. 25, 2019), XP081521945.

* cited by examiner

| TS | Y | FORECAST |
|---|---|---|
| 2021-10-01 00:00:00.000 | 1 | NULL |
| 2021-10-02 00:00:00.000 | 2 | NULL |
| 2021-10-03 00:00:00.000 | 3 | NULL |
| 2021-10-04 00:00:00.000 | 4 | NULL |
| 2021-10-05 00:00:00.000 | 5 | NULL |
| 2021-10-06 00:00:00.000 | 6 | NULL |
| 2021-10-07 00:00:00.000 | 7 | NULL |
| 2021-10-08 00:00:00.000 | 8 | 8 |
| 2021-10-09 00:00:00.000 | NULL | 8.998658371 |
| 2021-10-10 00:00:00.000 | NULL | 9.998858291 |
| 2021-11-01 00:00:00.000 | 2 | NULL |
| 2021-11-02 00:00:00.000 | 3 | NULL |
| 2021-11-03 00:00:00.000 | 4 | NULL |
| 2021-11-04 00:00:00.000 | 5 | NULL |
| 2021-11-05 00:00:00.000 | 6 | NULL |
| 2021-11-06 00:00:00.000 | 7 | NULL |
| 2021-11-07 00:00:00.000 | 8 | NULL |
| 2021-11-08 00:00:00.000 | 9 | 9 |
| 2021-11-09 00:00:00.000 | NULL | 9.998949824 |
| 2021-11-10 00:00:00.000 | NULL | 10.99835189 |

ENTRY 1
ENTRY 2
ENTRY 3
ENTRY 4
. . .
ENTRY N

ENHANCED TIME SERIES FORECASTING

CROSS-REFERENCE TO RELATED APPLICATIONS

This application is a continuation of co-pending U.S. application Ser. No. 17/877,588, filed Jul. 29, 2022, entitled "ENHANCED TIME SERIES FORECASTING," which claims the benefit of U.S. Provisional Application No. 63/351,016, filed Jun. 10, 2022, entitled "ENHANCED TIME SERIES FORECASTING," and these applications are hereby incorporated by reference herein in their entirety.

TECHNICAL FIELD

Aspects of the present disclosure relate to time series analysis, and more particularly, to an enhanced gradient boosting decision tree (GBDT)-based algorithm for time series forecasting.

BACKGROUND

Time-series analysis often refers to a variety of statistical modeling techniques including trend analysis, seasonality/cyclicality analysis, and anomaly detection. Predictions based on time-series analysis are extremely common and used across a variety of industries. For example, such predictions are used to predict values that change over time including weather patterns that can impact a range of other activities and sales that impact revenue forecasts, stock price performance, and inventory stocking requirements. In addition, time series analysis can be used in medicine to establish baselines for heart or brain function and in economics to predict interest rates.

Time-series predictions are built by complex statistical models that analyze historical data. There are many different types of time series models (e.g., auto-regressive, moving average, exponential smoothing) and many different regression models (e.g., linear, polynomial). All models have multiple parameters on which they can be built. Modern data scientists leverage machine learning (ML) techniques to find the best model and set of input parameters for the prediction they are working on.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Time series forecasting is a common task in time series analysis and is one of the most commonly utilized features by data analysts. Many data providers have built-in forecasting support that is based on any of a number of algorithms currently in use such as exponential smoothing, ARIMA, and Prophet. However, obtaining accurate forecasting is challenging and many of the algorithms currently being used for time series forecasting have considerable drawbacks. For example, many algorithms can only fit a linear trend or only one seasonal component, which is an invalid assumption in most use cases. Other algorithms are slow to train and can consume a lot of memory, while also lacking features such as support for multiple seasonal components and holiday effects. In addition, many algorithms suffer from relatively low accuracy unless they are tuned with domain knowledge and ML expertise.

Embodiments of the present disclosure provide a fast (real-time) and accurate time series forecasting algorithm. The time series forecasting algorithm is a gradient boosting decision tree (GBDT) based algorithm that supports multiple seasonal components detection, automatic data cleaning, unidirectional feature weights adjustment, linear trend extrapolation, holiday effects, missing data robustness, multivariate forecasting, and automatic hyperparameter tuning. A processing device may analyze a set of time series data using a time series forecasting model comprising an attributes model and a trend detection model. The attributes model may comprise a modified GBDT based algorithm. Analyzing the set of time series data comprises determining a set of features of the set of time series data, the set of features including periodic components as well as arbitrary components. A trend of the set of time series data may be determined using the trend detection model and the set of features and the trend may be combined to generate a time series forecast.

Figure 1:
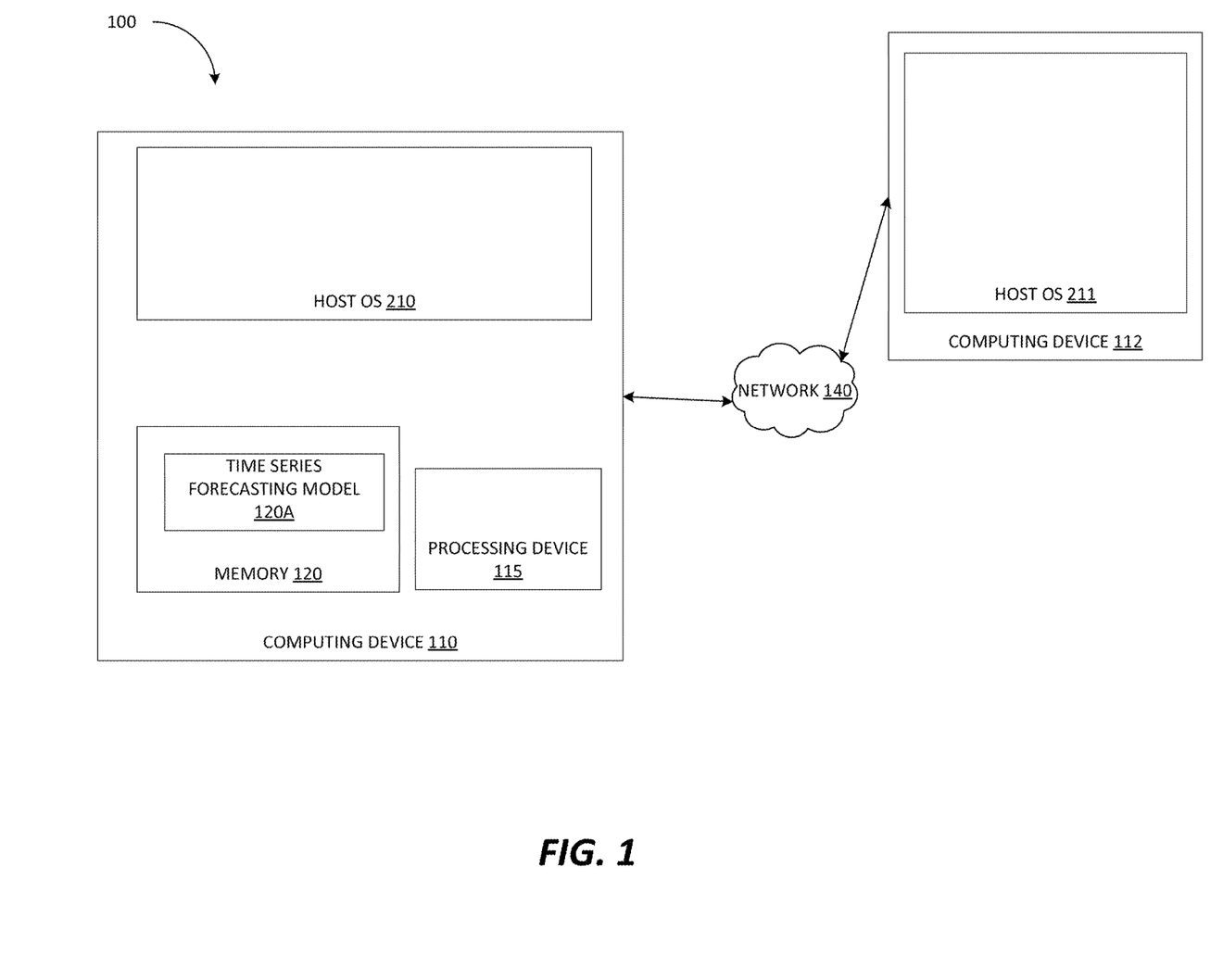
FIG. 1 is a block diagram that illustrates an example system, in accordance with some embodiments of the present disclosure.

FIG. 1 is a block diagram that illustrates an example system 100. As illustrated in FIG. 1, the system 100 includes a computing device 110, and a plurality of computing device 112. The computing devices 110 and 112 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g., cell towers), etc. In some embodiments, the network 140 may be an L3 network. The network 140 may carry communications (e.g., data, message, packets, frames, etc.) between computing device 110 and computing device 112. Each computing device 110 and 112 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.—not shown), and other hardware devices (e.g., sound card, video card, etc.—not shown). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 112 may comprise a single machine or may include multiple interconnected machines (e.g., multiple servers configured in a cluster). The computing devices 110 and 112 may be implemented by a common entity/organization or may be implemented by different entities/organizations. For example, computing device 110 may be operated by a first company/corporation and one or more computing device 112 may be operated by a second company/corporation. Each of computing device 110 and computing device 112 may execute or include an operating system (OS) such as host OS 210 and host OS 211 respectively, as discussed in more detail below. The host OS of a computing device 110 and 112 may manage the execution of other components (e.g., software, applications, etc.) and/or may manage access to the hardware (e.g., processors, memory, storage devices etc.) of the computing device. In some embodiments, each of computing device 110 and computing device 112 may constitute a deployment of a cloud data platform or data exchange.

As shown in FIG. 1, the memory 120 may include a time series forecasting module 120A which may be executed by the processing device 115 in order to perform some or all of the functions described herein.

Figure 2:
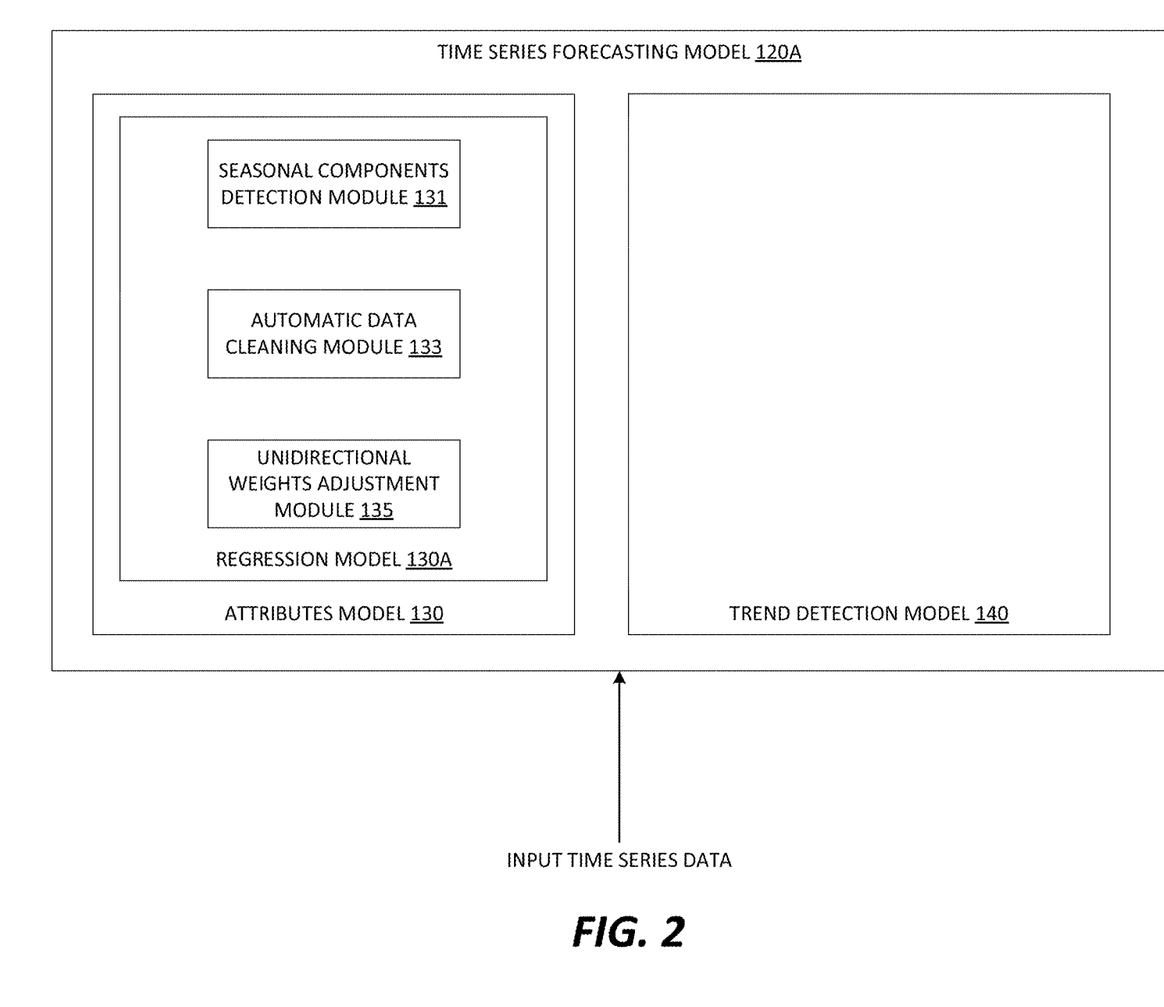
FIG. 2 is a block diagram that illustrates an example time series forecasting model, in accordance with some embodiments of the present disclosure.

FIG. 2 illustrates the time series forecasting module 120A in accordance with some embodiments of the present disclosure. The time series forecasting module may comprise 2 primary components, the attributes model 130 and the trend detection model 140. The attributes model 130 may capture features (also referred to herein as seasonal components) of the input time series data while the trend detection model 140 captures trends within the input time series data. The time series forecasting model 120A may be an additive model that combines the output of the attributes model 130 (features) and the trend detection model 140 (trends) to generate a final time series forecast/prediction.

The attributes model 130 may comprise a regression model 130A that has been modified to perform time series forecasting as discussed in further detail herein. For example, the regression model 130A may comprise an optimized distributed gradient boosting library designed to be highly efficient, flexible and portable. The regression model 130A may implement machine learning algorithms under the gradient boosting framework. The regression model 130A may provide a parallel tree boosting (also known as GBDT, or gradient boosting machine (GBM)) that solves many data science problems in a fast and accurate way (particularly with tabular data).

Figure 3:
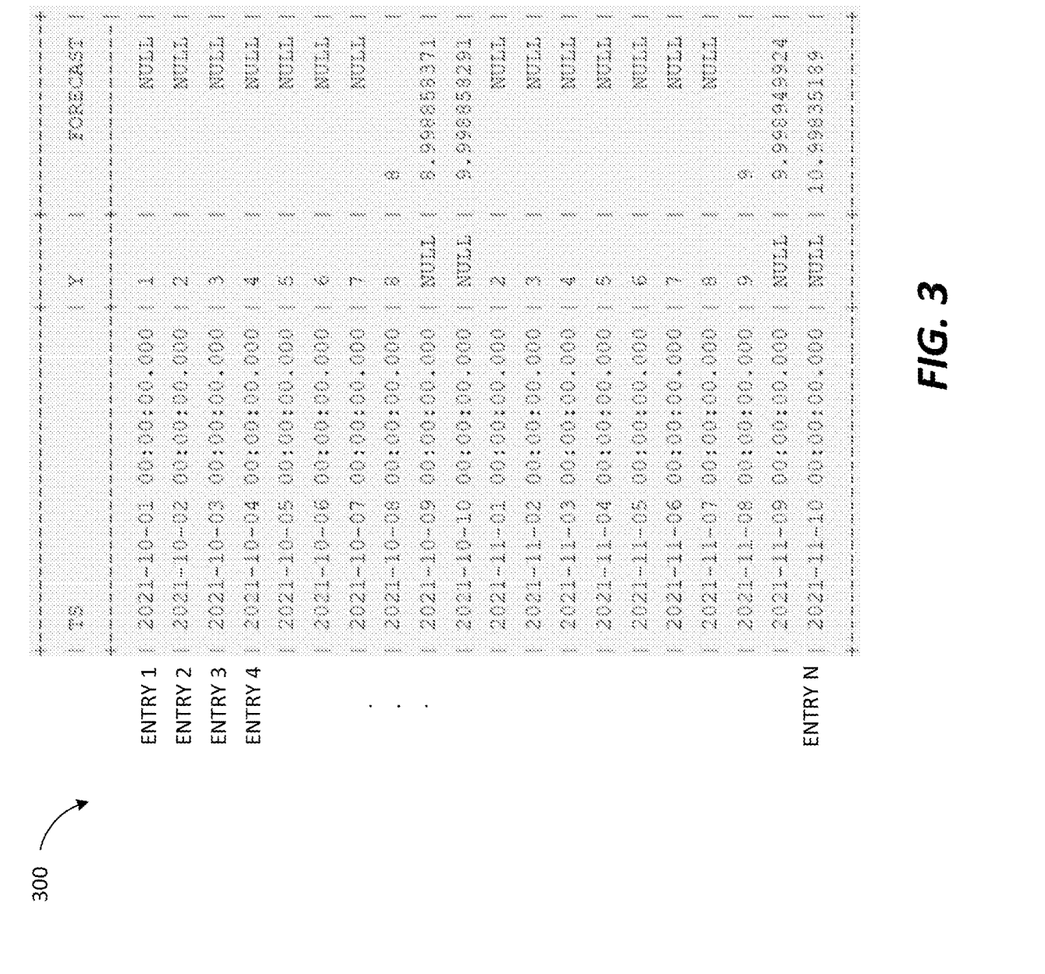
FIG. 3 is a diagram illustrating example time series data, in accordance with some embodiments of the present disclosure.

The attributes model 130 may be trained using any appropriate dataset. The training dataset may comprise a collection of real-world time series of different observation frequencies (e.g., yearly, quarterly, monthly, weekly, daily and hourly) and from different domains (e.g., micro, industry, macro, finance, and demographic, among others). FIG. 3 illustrates example input data 300 on which the time series forecasting module 120A may operate to generate a time series forecast. The input data 300 may comprise entries 1-N. Each entry may comprise a timestamp (as shown in the timestamp column—shown as "TS") and a label (e.g., 1, 2, 3, 4 as shown in the label column—shown as "Y").

Referring also to FIG. 2, the attributes model 130 may be modified with a seasonal components detection module 131 that enables it to extract features from the input data using natural language processing and/or any other appropriate means for extracting features from the input data. In the example of FIGS. 2 and 3, the attributes model 130 may extract all possible seasonal components from the timestamp column of the input data 300 as features. For example, hour of day, day of week, week of year, day of month, and month of year. During operation, the seasonal components detection module 131 may allow the attributes model 130 to adjust the weights of extracted features according to the strength of the detected pattern(s). Thus, compared to other algorithms that use a fixed seasonal period, the attributes model 130 may detect natural periods with a high accuracy. For example, the seasonal components detection module 131 may take the different numbers of days in each month of the year into account instead of simply assuming each month is a fixed number of days.

Figure 4A:
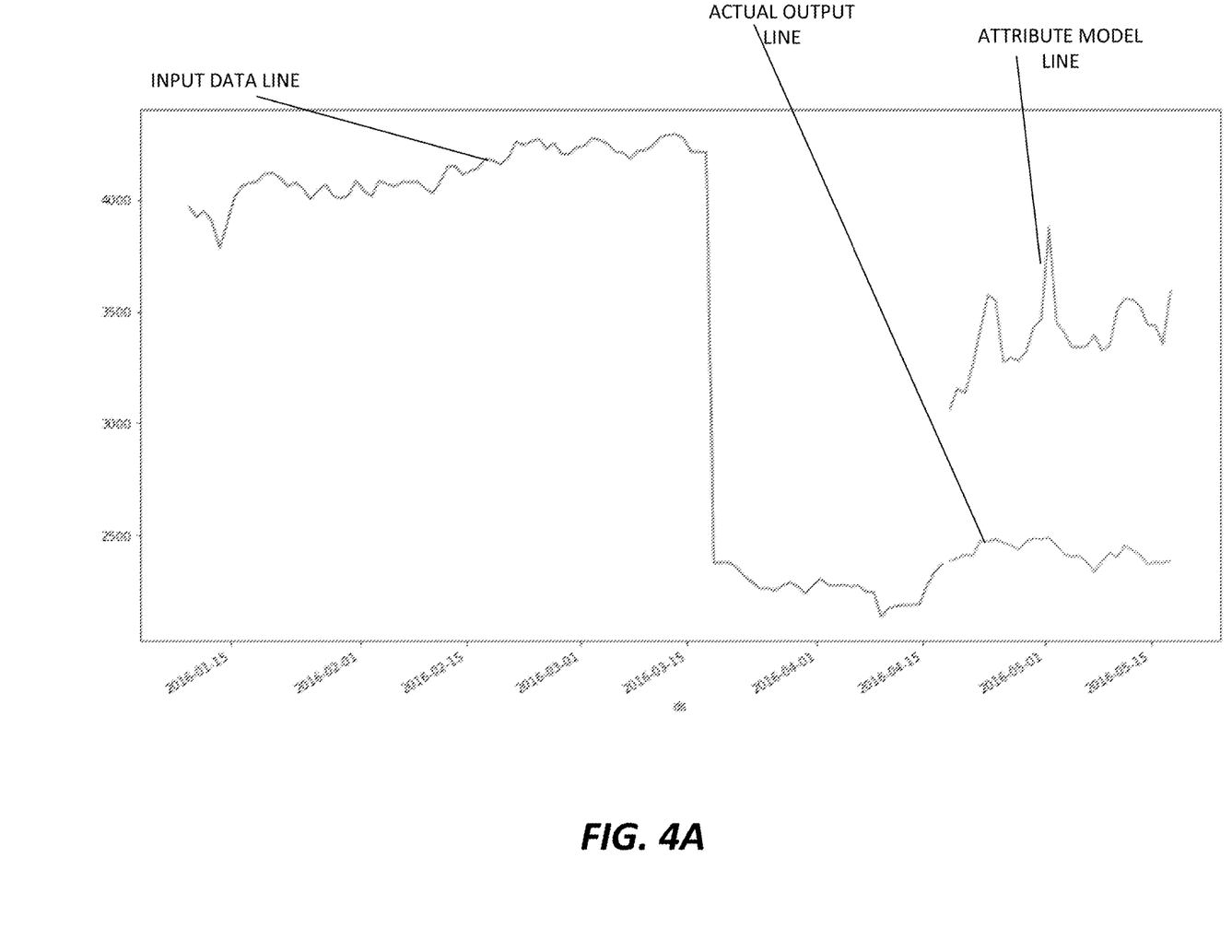
FIGS. 4A-4D are graphs illustrating variations in time series data and corresponding outputs of an attribute model, in accordance with some embodiments of the present disclosure.

The input time series data may also include trends, step changes and noise (i.e., non-seasonal components). It is critical to strip these non-seasonal components from the input data (time series data) before detecting the seasonal components as non-seasonal components may cause all seasonal components to be amplified with a large variance, and the starting point of the forecasting may be sensitive to step changes as shown in FIG. 4A. As can be seen in FIG. 4A, the large step change in the input data line has caused an amplification in the seasonal components of the attribute model line (representing the output of the seasonal components detection module 131 by itself) and has also caused the starting point of the forecasting (i.e., starting point of the attribute model line) to be skewed. However, separating the seasonal components from the non-seasonal components of the input data can be challenging. Thus, the attributes model 130 may be modified to include an automatic data cleaning module 133 which may serve to filter all such trends, step changes and noise (non-seasonal components) from the input data in order to clean the input data for seasonal components fitting.

Figure 4B:
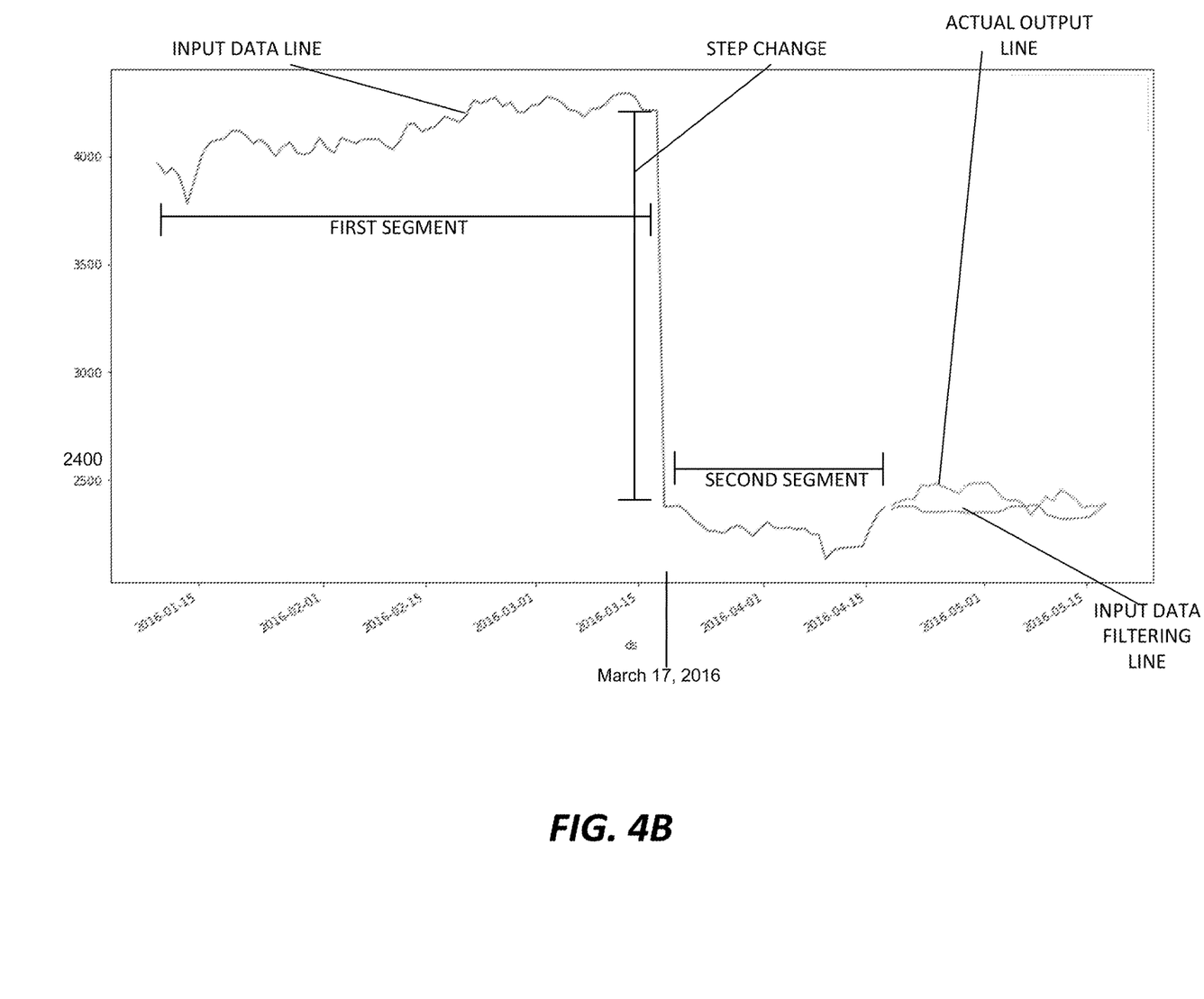

During forecasting, the automatic data cleaning module 133 may produce an adjustment which may be applied to the input data by the attributes model 130 before seasonal component detection to remove any non-seasonal components from the input data. The adjustment may be represented by the input data filtering line shown in FIG. 4B, which is relatively flat and to which the attributes model 130 may fit the input data to remove the non-seasonal components and anchor the starting point as shown in FIG. 4B. As can be seen, the input data filtering line of FIG. 4B may closely resemble the characteristics of the second segment of input data, which corresponds to the segment of input data received after the step change (e.g., Mar. 17, 2016-Apr. 17, 2016), instead of all of the input data received from Jan. 15, 2016. This is because the automatic data cleaning module 133 may continuously analyze the input data to sense/ identify a current "context" of the input data and continuously update/modify the adjustment/input data filtering line based on the current context (e.g., continuously perform self-adaptive re-contextualization). The current context of the input data may refer to characteristics of a current segment of input data including the value of data points of the current segment (e.g., the average value of data points of the current segment) and/or the seasonal components/features extracted from the data points of the current segment. The automatic data cleaning module 133 may generate the adjustment/input data filtering line based on the current context (e.g., an average value of the data points of the current segment and e.g., common patterns in the seasonal components/features extracted from the series of data points of the current segment).

Referring to FIG. 4B, the automatic data cleaning module 133 may begin analyzing the input data beginning on Jan. 15, 2016, and on Feb. 1, 2016, may determine that the average value of data points analyzed thus far is 4000 (and that all or most of the data points are within a value threshold of 4000) and may determine the seasonal components as shown in FIG. 4B. The automatic data cleaning module 133 may determine that the first segment of input data from Jan. 15, 2016 to Feb. 1, 2016, includes values within the value threshold of 4000 and seasonal components of the first segment fit a common pattern (i.e., are within a seasonal components threshold). The automatic data cleaning module 133 may determine the current context of the input data based on the values of the series of data points (e.g., the average value) and/or the seasonal components/features (e.g., an average of the seasonal components/features) of the first segment. As the automatic data cleaning module 133 continues to analyze the input data, it may determine that the values of the input data through Mar. 16, 2016, are within the value threshold of 4000 and the seasonal components extracted from the input data through Mar. 16, 2016, are within the seasonal components threshold of the seasonal components extracted from the input data between Jan. 15, 2016, and Feb. 1, 2016. Thus, the automatic data cleaning module 133 may determine that the first segment may include the input data through Mar. 16, 2016, as well. It should be noted that input data can be analyzed to determine whether a new segment of the input data has begun (and thus whether the current context must be updated) with any appropriate frequency/granularity (e.g., hourly, daily, weekly) and with any appropriate level of accuracy. For example, the value and seasonal components thresholds may be set such that only data points of input data that are extremely close to each other in value and result in very consistent seasonal components may be identified as a segment of input data.

Continuing the example of FIG. 4B, on Mar. 17, 2016, the automatic data cleaning module 133 may determine that a change in the value of a data point(s) and/or change in the seasonal components is beyond their respective threshold and thus that the input data from Mar. 17, 2016, onwards corresponds to a new segment (second segment) of the input data and update the current context accordingly. More specifically, the decision tree generated by the regression model 130A will have one or more branches corresponding to data points of the input data before the large step change (e.g., before Mar. 17, 2016) that are around the 4000 value, and one or more branches corresponding to data points of the input data after the large step change (e.g., on or after Mar. 17, 2016) that are around the 2400 value. The automatic data cleaning module 133 may analyze the branches before and after the large step change, and sense that the context of the input data has changed sharply after the large step change.

The automatic data cleaning module 133 may recalculate the current context based on the characteristics of the second segment of input data including, e.g., the average values of data points of the input data after the large step change, as well as the seasonal components of the input data (e.g., common patterns therein) after the large step change. When it is time to perform time series forecasting (e.g., on Apr. 16, 2016), the automatic data cleaning module 133 may then generate/modify the input data filtering line (i.e., the adjustment to the input data) based on the current context of the input data (based on the second segment). The regression model 130A may fit the input data to the input data filtering line in order to remove the effects of non-seasonal components such as trends, step changes and noise from the input data.

Although time series forecasting is sensitive to the freshness of the input data (i.e., the newer the data, the more weight it should receive), it can be challenging to adjust the weights applied to different segments of input data manually. Because the attributes model 130 is a tree based model that is unidirectional, the patterns learned from older segments of the input data can be dropped or have less weight assigned to them during forecasting, while newer segments of input data may be assigned a greater weight. Thus, the attributes model 130 may be modified with a unidirectional weights adjustment module 135 which may utilize the unidirectional nature of the attributes model 130's tree structure to automatically separate the entire input data into multiple segments based on common patterns (as discussed above with respect to the automatic data cleaning module 133), and apply weights to each segment in such a manner so that the more recent the segment of input data, the more weight it is assigned when being used for forecasting. In some embodiments, the unidirectional weights adjustment module 135 may determine different segments based on common patterns in a manner similar to that used by the automatic data cleaning module 133 to determine the current context of the input data. Although the less recent segments are dropped/ assigned a lower weight, some common patterns (e.g., seasonal components) will be left. This also aids in missing value imputation. Based on the above discussion, it follows that the output of the automatic data cleaning module 133 (i.e., the input data filtering line) may often be given more weight when the attributes model 130 is determining the features of the input data.

Holidays (e.g., Christmas, Thanksgiving) may have a significant effect on time series data patterns. The attributes model 130 may handle holidays in two ways. First, the attributes model 130 may explicitly represent each holiday as an extra feature e.g., using a hot encoded holiday. Second, the attributes model 130 may implicitly rely on existing timestamp derived features. For example, the attributes model 130 may utilize the "day of the week" and "week of the year features" to capture "Martin Luther King Jr. Day."

In tree algorithms such as the attributes model 130, branch directions for missing values are learned during training. Thus, the attributes model 130 may include the ability to fill in missing data values from the input data. In some embodiments, the attributes model 130 may ignore missing timestamps.

Figure 4C:
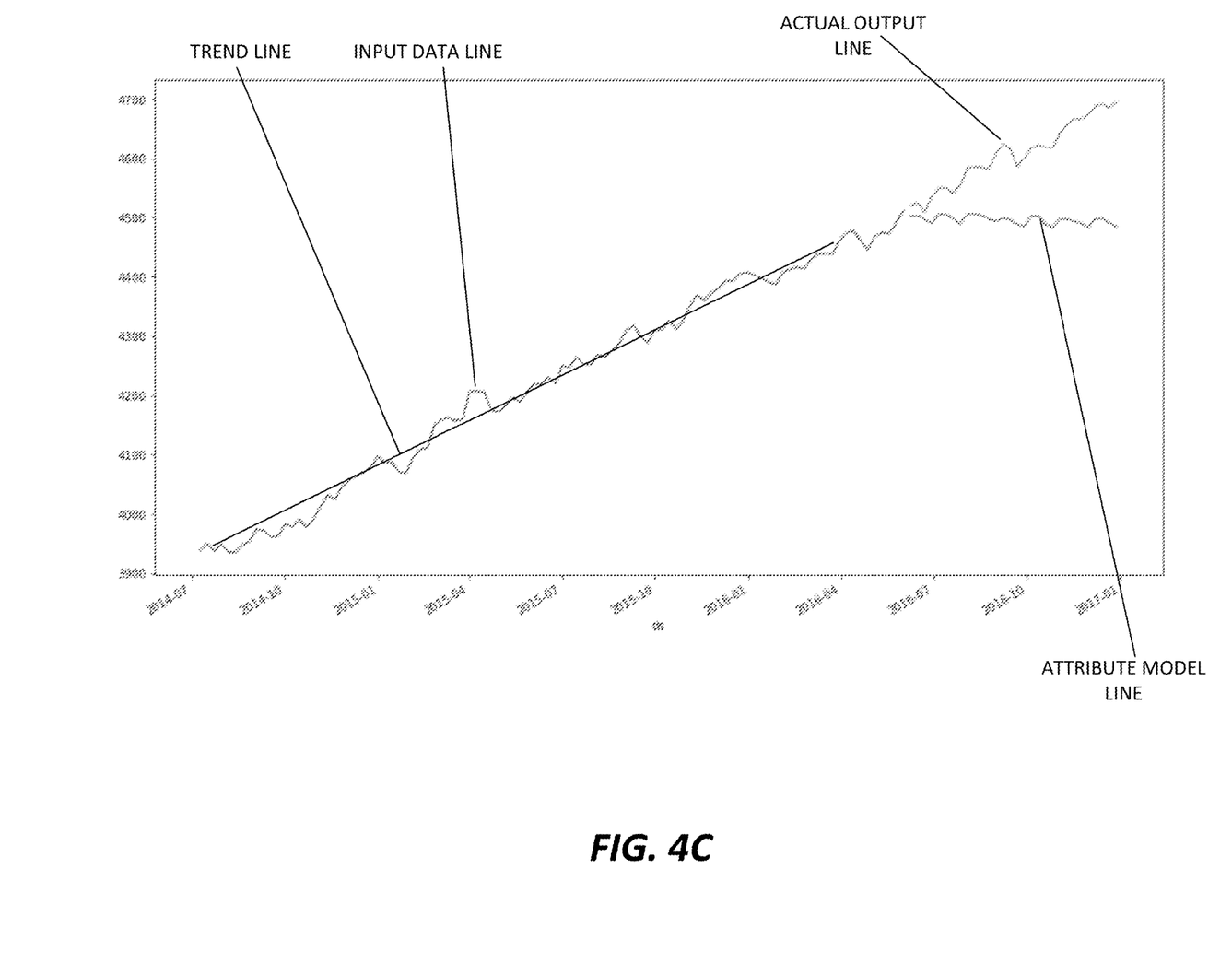

As discussed herein, the output of the attribute model 130 may correspond to the features of the input data over time (time series data). Although the attributes model 130 is adept at capturing features, it does not have extrapolation capabilities. As can be seen in FIG. 4C, the attribute model 130 can extract the appropriate features from the input data (as shown by the attribute model line, compare with the input data line) but cannot detect a particular trend that the input data is following (compare the direction of the attribute model line with the actual output line). Thus, the trend detection model 140 may comprise any appropriate algorithm that can be used to predict and model the relationship between an independent and a dependent variable (e.g., time and value of the label column respectively). For example, the trend detection model 140 may comprise a linear regression algorithm that determines the trend line as a unique line that minimizes the sum of squared deviations from the input data, for example. In other examples, the trend detection model 140 may comprise an exponential trend algorithm or a damped trend algorithm.

Figure 4D:
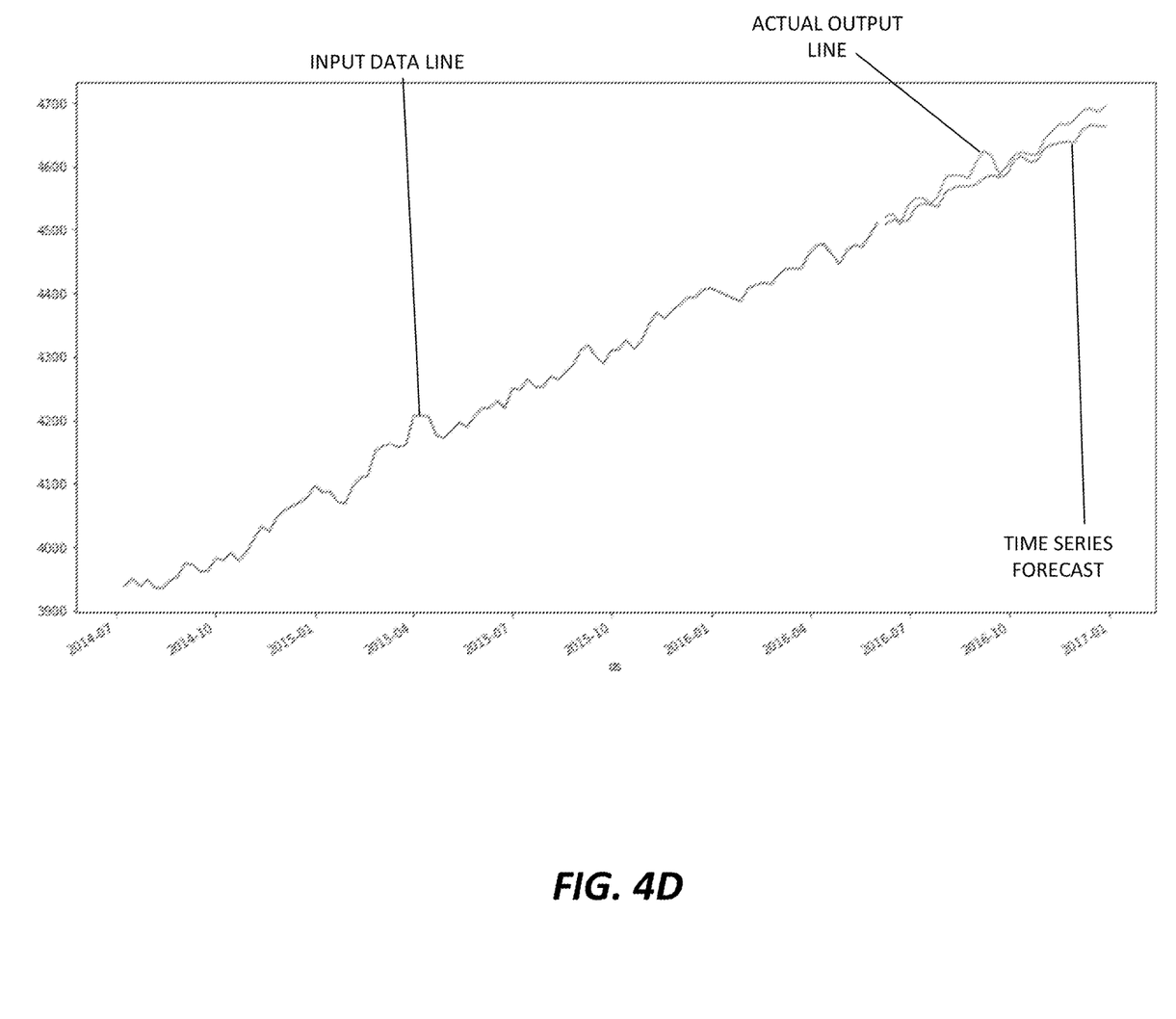

Once the attribute model 130 has extracted the features of the input data e.g., seasonal components (as shown by the attribute model line of FIG. 4C) and the trend detection model 140 has determined the trend of the input data (as shown by the trend line of FIG. 4C), the time series forecasting model 120A may combine these two outputs to form a time series forecast as shown by FIG. 4D.

Embodiments of the present disclosure also support automatic feature (also referred to as hyperparameter) selection tuning. Feature selection tuning can help improve the performance of the time series forecasting model 120A. Examples of features can include timestamp derived features, number of trees in the boosted model, the maximum step of each tree during training, and linear trend training horizon. More specifically, the time series forecasting model 120A may use trial and error to try different sets of features to find the set of features that results in the least amount of error in the output of the time series forecasting model 120A. Feature tuning requires that the training data be split into training, evaluation and sometimes test sets for performance validation. Some common techniques include hold-out-set validation, k-fold cross validation, and the assumption is that the test set complies with the same distribution as the training set. In time series modeling, such datasets split is always based on a timestamp sequential split. Because it is harder to guarantee the same distribution with a sequential split compared to a random split, the accuracy improvement may also be harder to guarantee. Embodiments of the present disclosure also support multivariate time series forecasting by allowing exogenous variables. In some embodiments, the time series forecasting model 120A may provide prediction interval support, support for logistic trends (in addition to linear trends), and a differencing function.

Figure 5:
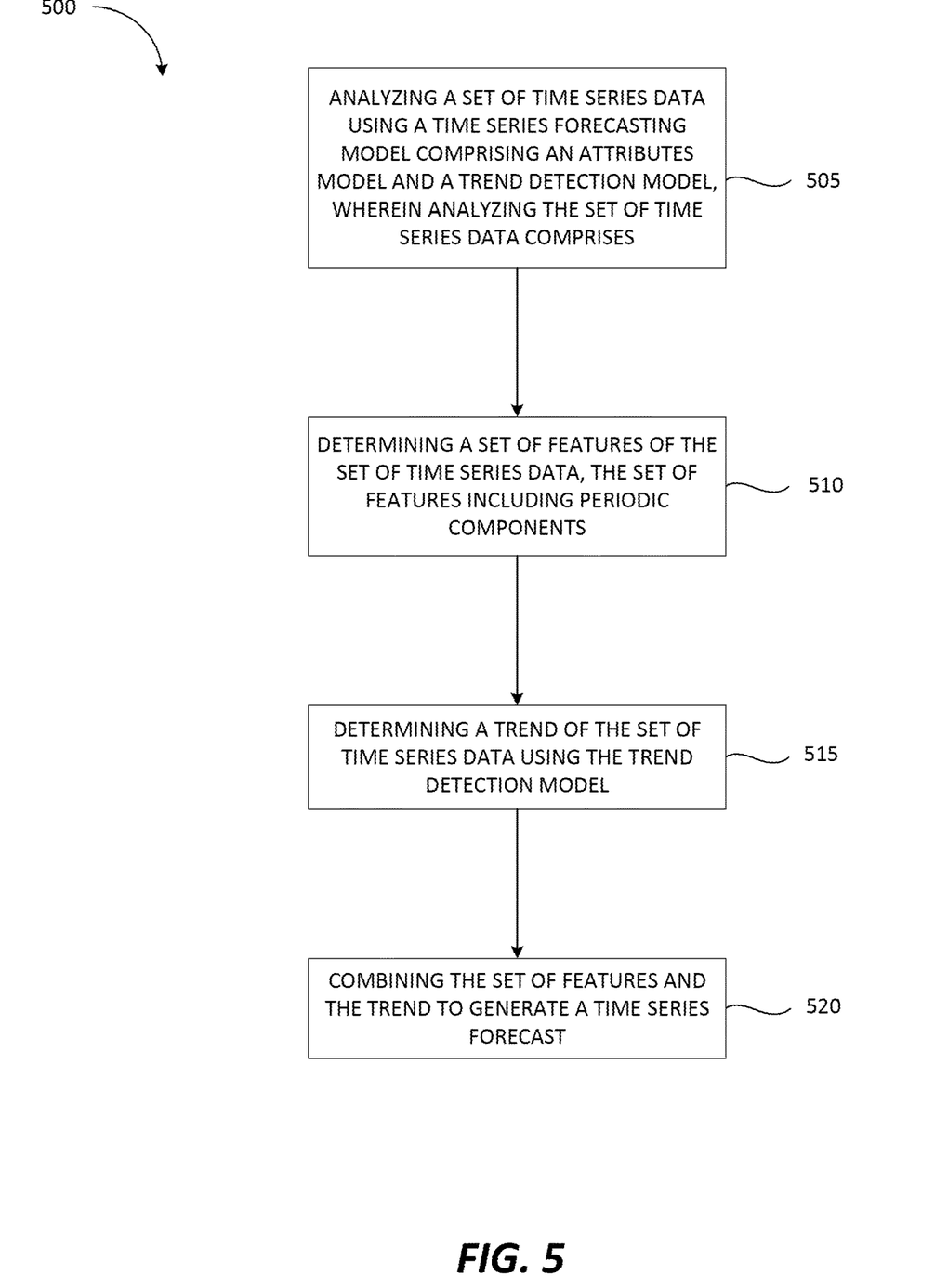
FIG. 5 is a flow diagram of a method for performing a time series forecast using a modified gradient boosting decision tree (GBDT) based algorithm, in accordance with some embodiments of the present disclosure.

FIG. 5 is a flow diagram of a method 500 of performing a time series forecasting using a modified gradient boosting decision tree (GBDT) based algorithm, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 110 executing the time series forecasting model 120A as illustrated in FIG. 2).

Referring also to FIG. 2, at block 505 the time series forecasting module 120A may analyze input time series data (input data), the time series forecasting module 120A may comprise 2 primary components, the attributes model 130 and the trend detection model 140. At block 510, the attributes model 130 may (via seasonal components detection module 131) extract features from the input data using natural language processing and/or any other appropriate means for extracting features from the input data. In the example of FIGS. 2 and 3, the attributes model 130 may extract all possible seasonal components from the timestamp column of the input data 300 as features. For example, hour of day, day of week, week of year, day of month, and month of year. During operation, the seasonal components detection module 131 may allow the attributes model 130 to adjust the weights of extracted features according to the strength of the detected pattern(s). Thus, compared to other algorithms that use a fixed seasonal period, the attributes model 130 may detect natural periods with a high accuracy. For example, the seasonal components detection module 131 may take the different numbers of days in each month of the year into account instead of simply assuming each month is a fixed number of days.

The input time series data may also include trends, step changes and noise (i.e., non-seasonal components). It is critical to strip these non-seasonal components from the input data (time series data) before detecting the seasonal components as such non-seasonal components may cause all seasonal components to be amplified with a large variance, and the starting point of the forecasting may be sensitive to step changes as shown in FIG. 4A. As can be seen in FIG. 4A, the large step change in the input data line has caused an amplification in the seasonal components of the attribute model line (representing the output of the seasonal components detection module 131 by itself) and has also caused the starting point of the forecasting (i.e., starting point of the attribute model line) to be skewed. However, separating the seasonal components from the non-seasonal components of the input data can be challenging. Thus, the attributes model 130 may be modified to include an automatic data cleaning module 133 which may serve to filter all such trends, step changes and noise (non-seasonal components) from the input data in order to clean the input data for seasonal components fitting.

During forecasting, the automatic data cleaning module 133 may produce an adjustment which may be applied to the input data by the attributes model 130 before seasonal component detection to remove any non-seasonal components from the input data. The adjustment may be represented by the input data filtering line shown in FIG. 4B, which is relatively flat and to which the attributes model 130 may fit the input data to remove the non-seasonal components and anchor the starting point as shown in FIG. 4B. As can be seen, the input data filtering line of FIG. 4B may closely resemble the characteristics of the second segment of input data, which corresponds to the segment of input data received after the step change (e.g. Mar. 17, 2016-Apr. 17, 2016), instead of all of the input data received from Jan. 15, 2016. This is because the automatic data cleaning module 133 may continuously analyze the input data to sense/identify a current "context" of the input data and continuously update/modify the adjustment/input data filtering line based on the current context (e.g., continuously perform self-adaptive re-contextualization). The current context of the input data may refer to characteristics of a current segment of input data including the value of data points of the current segment (e.g., the average value of data points of the current segment) and/or the seasonal components/features extracted from the data points of the current segment. The automatic data cleaning module 133 may generate the adjustment/input data filtering line based on the current context (e.g., an average value of the data points of the current segment and e.g., common patterns in the seasonal components/features extracted from the series of data points of the current segment).

Although time series forecasting is sensitive to the freshness of the input data (i.e., the newer the data, the more weight it should receive), it can be challenging to adjust the weights applied to different segments of input data manually. Because the attributes model 130 is a tree based model that is unidirectional, the patterns learned from older segments of the input data can be dropped or have less weight assigned to them during forecasting, while newer segments of input data may be assigned a greater weight. Thus, the attributes model 130 may be modified with a unidirectional weights adjustment module 135 which may utilize the unidirectional nature of the attributes model 130's tree structure to automatically separate the entire input data into multiple segments based on common patterns (as discussed above with respect to the automatic data cleaning module 133), and apply weights to each segment in such a manner so that the more recent the segment of input data, the more weight it is assigned when being used for forecasting. In some embodiments, the unidirectional weights adjustment module 135 may determine different segments based on common patterns in a manner similar to that used by the automatic data cleaning module 133 to determine the current context of the input data. Although the less recent segments are dropped/assigned a lower weight, some common patterns (e.g., seasonal components) will be left. This also aids in missing value imputation. Based on the above discussion, it follows that the output of the automatic data cleaning module 133 (i.e., the input data filtering line) may often be given more weight when the attributes model 130 is determining the features of the input data.

The output of the attribute model 130 may correspond to the features of the input data over time (time series data). Although the attributes model 130 is adept at capturing features, it does not have extrapolation capabilities. As can be seen in FIG. 4C, the attribute model 130 can extract the appropriate features from the input data (as shown by the attribute model line, compared with the input data line) but cannot detect a particular trend that the input data is following (compare the direction of the attribute model line with the actual output line). Thus, at block 515, the trend detection model 140 may predict and model the relationship between an independent and a dependent variable (e.g., time and value of the label column respectively). The trend detection model 140 may determine the trend line as a unique line that minimizes the sum of squared deviations from the input data, for example.

Once the attribute model 130 has extracted the features of the input data e.g., seasonal components (as shown by the attribute model line of FIG. 4C) and the trend detection model 140 has determined the trend of the input data (as shown by the trend line of FIG. 4C), the time series forecasting model 120A may combine these two outputs to form a time series forecast as shown by FIG. 4D.

Figure 6:
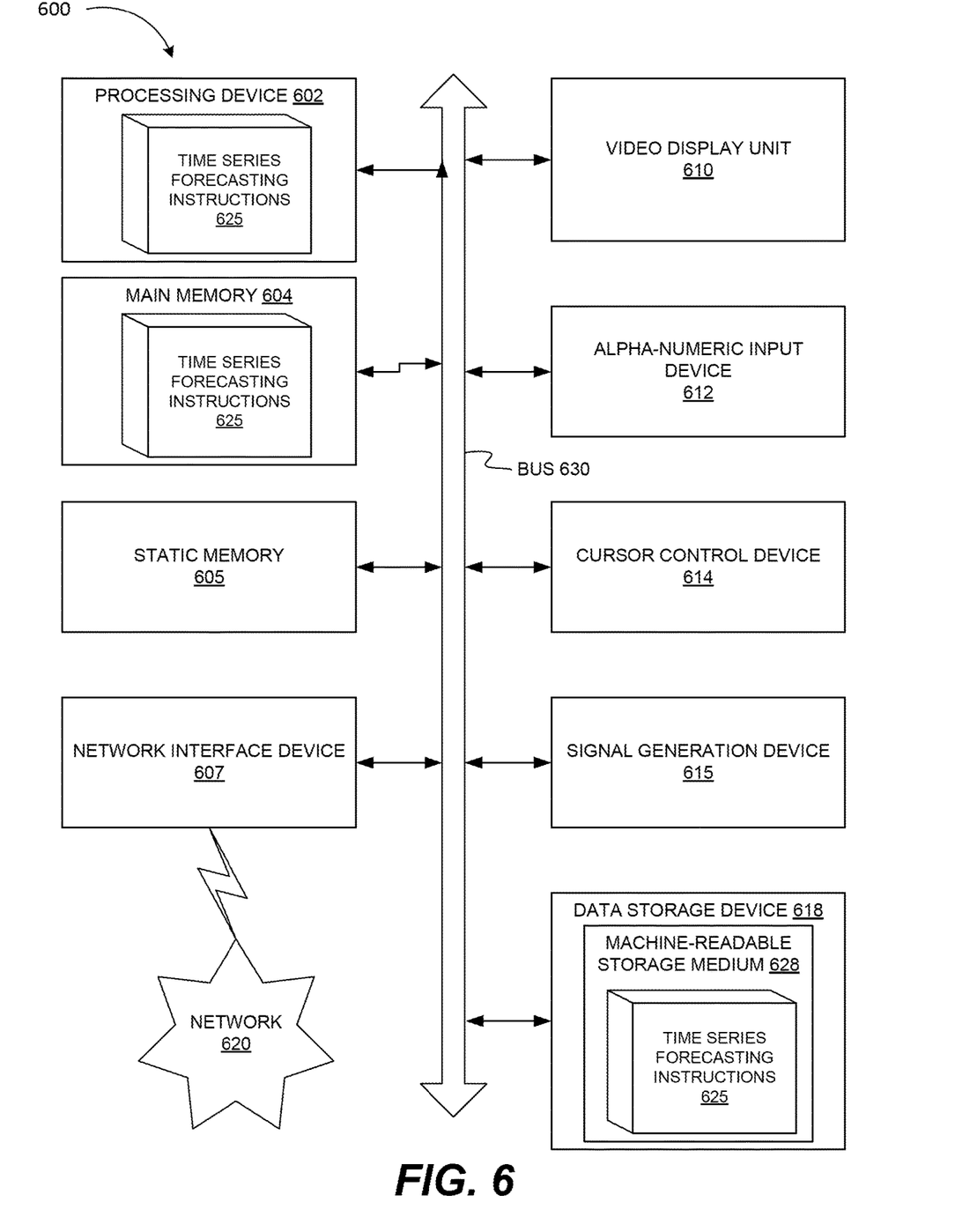
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for performing a time series forecast.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM)), a static memory 605 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 607 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute time series forecasting instructions 625, for performing the operations and steps discussed herein.

The data storage device 618 may include a machine-readable storage medium 628, on which is stored one or more sets of time series forecasting instructions 625 (e.g., software) embodying any one or more of the methodologies of functions described herein. The time series forecasting instructions 625 may also reside, completely or at least partially, within the main memory 604 or within the processing device 602 during execution thereof by the computer system 600; the main memory 604 and the processing device 602 also constituting machine-readable storage media. The time series forecasting instructions 625 may further be transmitted or received over a network 620 via the network interface device 607.

The machine-readable storage medium 628 may also be used to store instructions to perform a method for specifying a stream processing topology (dynamically creating topics, interacting with these topics, merging the topics, reading from the topics, and obtaining dynamic insights therefrom) via a client-side API without server-side support, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
determining, using a weights adjustment module comprising an attributes model of a time series forecasting model, the model comprising a set of features based on time series data, the set of features including periodic components;
dividing the time series data into a set of segments;
for each segment of the set of segments, assigning a weight using an age of the segment, resulting in a set of weighted segments of time series data;
determining, using a trend detection model of the time series forecasting model, trend data from the set of weighted segments of time series data; and
generating, by combining the set of features and the trend data, a time series forecast.

2. The method of claim 1, wherein the set of features further includes arbitrary components.

3. The method of claim 1, wherein each of the set of segments corresponds to a time period of the time series data, and dividing the time series data into the set of segments comprises identifying each of the set of segments based on values of the time series data of each time period and one or more seasonal components of the time series data of each time period.

4. The method of claim 1, wherein the attributes model comprises a seasonal components detection module comprising a natural language processing algorithm to extract the set of features from the time series data.

5. The method of claim 1, wherein the attributes model is a tree-based model.

6. The method of claim 1, wherein the attributes model comprises an automatic data cleaning module, the method further comprising filtering, using the automatic data cleaning module, at least one of trends, step changes, or noise from the time series data.

7. The method of claim 6, wherein filtering at least one of trends, step changes, or noise from the time series data comprises:
identifying a current segment of the time series data;
determining a current context of the time series data based on values of the time series data of the current segment and one or more seasonal components of the time series data of the current segment;
determining an adjustment to the time series data based on the current context of the time series data; and
applying the adjustment to the time series data.

8. A system comprising:
a memory; and
a processing device, operatively coupled to the memory, the processing device to:
determine, using a weights adjustment module comprising an attributes model of a time series forecasting model, the model comprising a set of features based on time series data, the set of features including periodic components;
divide the time series data into a set of segments;
for each segment of the set of segments, assign a weight using an age of the segment, resulting in a set of weighted segments of time series data;
determine, using a trend detection model of the time series forecasting model, trend data from the set of weighted segments of time series data; and
generate, by combining the set of features and the trend data, a time series forecast.

9. The system of claim 8, wherein the set of features further includes arbitrary components.

10. The system of claim 8, wherein each of the set of segments corresponds to a time period of the time series data, and wherein to divide the time series data into the set of segments the processing device is to identify each of the set of segments based on values of the time series data of each time period and one or more seasonal components of the time series data of each time period.

11. The system of claim 8, wherein the attributes model comprises a seasonal components detection module comprising a natural language processing algorithm, and the processing device is further to extract the set of features from the time series data using the natural language processing algorithm.

12. The system of claim 8, wherein the attributes model is a tree-based model.

13. The system of claim 8, wherein the attributes model comprises an automatic data cleaning module, and the processing device is further to filter, using the automatic data cleaning module, any trends, step changes, and noise from the time series data.

14. The system of claim 13, wherein to filter any trends, step changes, and noise from the time series data, the processing device is to:
identify a current segment of the time series data;
determine a current context of the time series data based on values of the time series data of the current segment and one or more seasonal components of the time series data of the current segment;
determine an adjustment to the time series data based on the current context of the time series data; and
apply the adjustment to the time series data.

15. A non-transitory computer-readable medium, having instructions stored thereon which, when executed by a processing device, cause the processing device to:
determine, using a weights adjustment module comprising an attributes model of a time series forecasting model, the model comprising a set of features based on time series data, the set of features including periodic components;
divide the time series data into a set of segments;
for each segment of the set of segments, assign a weight using an age of the segment, resulting in a set of weighted segments of time series data;
determine, using a trend detection model of the time series forecasting model, trend data from the set of weighted segments of time series data; and
generate, by combining the set of features and the trend data, a time series forecast.

16. The non-transitory computer-readable medium of claim 15, wherein the set of features further includes arbitrary components.

17. The non-transitory computer-readable medium of claim 15, wherein each of the set of segments corresponds to a time period of the time series data, and wherein to divide the time series data into the set of segments the processing device is to identify each of the set of segments based on values of the time series data of each time period and one or more seasonal components of the time series data of each time period.

18. The non-transitory computer-readable medium of claim 15, wherein the attributes model comprises a seasonal components detection module comprising a natural language processing algorithm, and the processing device is further to extract the set of features from the time series data using the natural language processing algorithm.

19. The non-transitory computer-readable medium of claim 15, wherein the attributes model comprises an automatic data cleaning module, and the processing device is further to filter, using the automatic data cleaning module, at least one of trends, step changes, or noise from the time series data.

20. The non-transitory computer-readable medium of claim 19, wherein to filter at least one of trends, step changes, or noise from the time series data, the processing device is to:
- identify a current segment of the time series data;
- determine a current context of the time series data based on values of the time series data of the current segment and one or more seasonal components of the time series data of the current segment;
- determine an adjustment to the time series data based on the current context of the time series data; and
- apply the adjustment to the time series data.

* * * * *